(12) United States Patent
Anzalone et al.

(10) Patent No.: US 12,314,368 B2
(45) Date of Patent: May 27, 2025

(54) ENTITY-SPECIFIC USER AUTHENTICATION IN SHARED OFFICE DOCUMENT PROCESSING DEVICE

(71) Applicant: Xerox Corporation, Norwalk, CT (US)

(72) Inventors: Emily K. Anzalone, Rochester, NY (US); James P. Gorski, Penfield, NY (US); Donald L. Wegeng, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 382 days.

(21) Appl. No.: 17/524,784

(22) Filed: Nov. 12, 2021

(65) Prior Publication Data

US 2023/0153414 A1    May 18, 2023

(51) Int. Cl.
   *G06F 21/34*    (2013.01)
(52) U.S. Cl.
   CPC .................................. *G06F 21/34* (2013.01)
(58) Field of Classification Search
   CPC ........................................................ G06F 21/34
   See application file for complete search history.

(56) References Cited

U.S. PATENT DOCUMENTS

| | | | |
|---|---|---|---|
| 6,332,193 B1 | 12/2001 | Glass et al. | |
| 7,443,527 B1 | 10/2008 | Shigeeda | |
| 8,347,360 B2* | 1/2013 | Schultz | H04L 63/104 713/168 |
| 8,380,889 B2 | 2/2013 | Sretenovic | |
| 8,522,026 B2* | 8/2013 | Koga | G06F 21/608 726/28 |
| 8,776,132 B2 | 7/2014 | Low et al. | |
| 8,966,584 B2* | 2/2015 | Hughes | H04L 63/08 709/225 |
| 8,977,569 B2 | 3/2015 | Rao | |
| 9,603,090 B2 | 3/2017 | Khan et al. | |
| 9,721,268 B2 | 8/2017 | Bondesen et al. | |

(Continued)

OTHER PUBLICATIONS

A. E. Al-Chalabi, S. Essa, H. Shahzad and I. Damaj, "A wearable and ubiquitous NFC wallet," 2015 IEEE 28th Canadian Conference on Electrical and Computer Engineering (CCECE), Halifax, NS, Canada, 2015, pp. 152-157, doi: 10.1109/CCECE.2015.7129177. (Year: 2015).*

*Primary Examiner* — Jason D Recek
(74) *Attorney, Agent, or Firm* — Fox Rothschild LLP

(57) ABSTRACT

An app is supplied to user devices. The app provides shared device cards to digital wallets of the user devices. The shared device cards supply entity-specific authentication configuration settings to a shared document processing device. The shared document processing device receives user credentials and uses the entity-specific authentication configuration settings to supply (through a computerized network) the user credentials to entity-specific authentication servers specified in the entity-specific authentication configuration settings. In response, the shared document processing device receives approval/denial for a user to access the shared document processing device from the entity-specific authentication servers. Different shared device cards have different entity-specific authentication configuration settings that correspond to only one of the entity-specific authentication servers, limiting each of the shared device cards to use with a single authentication server.

20 Claims, 5 Drawing Sheets

(56) References Cited

U.S. PATENT DOCUMENTS

| | | | |
|---|---|---|---|
| 10,878,413 B2* | 12/2020 | Liu | G06Q 20/3829 |
| 10,949,719 B2 | 3/2021 | Nakamura et al. | |
| 11,120,436 B2 | 9/2021 | Radu | |
| 11,610,196 B1* | 3/2023 | Laureano | G06F 21/45 |
| 2006/0265740 A1* | 11/2006 | Clark | G06F 21/6218 |
| | | | 726/8 |
| 2008/0100414 A1* | 5/2008 | Diab | H04L 63/0861 |
| | | | 340/5.1 |
| 2020/0120731 A1* | 4/2020 | Yang | H04L 9/32 |
| 2020/0358754 A1* | 11/2020 | Nair | H04L 63/083 |

\* cited by examiner

ENTITY-SPECIFIC USER AUTHENTICATION IN SHARED OFFICE DOCUMENT PROCESSING DEVICE

BACKGROUND

Systems and methods herein generally relate to user authentication and more particularly to user authentication within document processing devices used in shared office environments.

Coworking, where workers from different companies share office space, is becoming more common. It is useful for a shared office product that is located in a coworking space to allow employees from more than one company to login and then access the value-added solutions that their respective employers have purchased. To support this capability, one issue that must be addressed is how to have individual login method information and credentials easily accessible to pass the information to the shared device.

SUMMARY

Methods herein supply an app to portable user devices through a computerized network. In these methods, the app provides shared device cards to digital wallets of the portable user devices. The shared device cards supply entity-specific authentication configuration settings to a document processing device. Such a document processing device is used for copying documents, printing documents, scanning documents, sending and receiving facsimiles, sending and receiving emails, and/or editing documents, etc.

The document processing device also receives user credentials. For example, users can manually supply their user credentials to the interface, or the document processing device can receive the user credentials from the shared device cards through the portable user devices. The document processing device uses the entity-specific authentication configuration settings to supply, through the computerized network, the user credentials to entity-specific authentication servers that are specified in the entity-specific authentication configuration settings. In response, the document processing device receives (from the entity-specific authentication servers) approval for the user to use the document processing device.

With such methods, different shared device cards can have different entity-specific authentication configuration settings and each of the different entity-specific authentication configuration settings corresponds to only one of the entity-specific authentication servers, thereby limiting each of the shared device cards to use with a single authentication server. The different entity-specific authentication configuration settings can contain different authentication requirements.

In some implementations, each of the shared device cards maintains only one of the user credentials that is different from other user credentials maintained by other shared device cards, and each of the shared device cards maintains only one of the entity-specific authentication configuration settings. Thus, each of the shared device cards is entity-specific to a single entity, and each of the shared device cards is user-specific to a single user associated with the corresponding portable user device on which the shared device card is maintained.

Systems herein include (among other components) a document processing device that is adapted to process documents. The document processing device includes (among other components) an interface and a communication device, both operatively connected to a processor. These systems also include an app that is adapted to provide shared device cards that, in turn, are adapted to communicate with the document processing device through the interface. The app is adapted to operate with digital wallets of portable user devices by supplying the shared device cards to the digital wallets. Further, the app is adapted to be supplied from entity-specific authentication servers to the portable user devices through a computerized network.

The shared device cards are adapted to supply entity-specific authentication configuration settings to the document processing device through the interface. The document processing device is adapted to receive user credentials. With these systems, users can manually supply their user credentials to the interface, or the document processing device can be adapted to receive the user credentials from the shared device cards through the portable user devices.

The processor is adapted to use the entity-specific authentication configuration settings to supply, through the computerized network, the user credentials to the entity-specific authentication servers specified in the entity-specific authentication configuration settings, using the communication device.

In response, the communication device is adapted to receive (from the entity-specific authentication servers) approval for the user to access the document processing device. Different ones of the shared device cards have different entity-specific authentication configuration settings that correspond to only one of the entity-specific authentication servers limiting each of the shared device cards to use with a single authentication server. The different entity-specific authentication configuration settings contain different authentication requirements.

In such systems, each of the shared device cards is adapted to maintain only one of the user credentials that is different from other user credentials maintained by other shared device cards, and each of the shared device cards is adapted to maintain only one of the entity-specific authentication configuration settings. Thus, each of the shared device cards is entity-specific to a single entity, and each of the shared device cards is user-specific to a single user associated with the corresponding portable user device on which the shared device card is maintained.

Multi-function devices herein include (among other components) an interface and a communication device both operatively connected to a processor. Such multi-function devices are adapted to, for example, copy documents, print documents, scan documents, send and receive facsimiles, send and receive emails, and/or edit documents, etc.

The interface is adapted to communicate with shared device cards supplied to portable user devices by an app. The app is adapted to operate with digital wallets of the portable user devices by supplying the shared device cards to the digital wallets. The app is adapted to be supplied from entity-specific authentication servers to the portable user devices through a computerized network.

The shared device cards are adapted to supply entity-specific authentication configuration settings to the multi-function device through the interface. The interface is also adapted to receive user credentials. For example, users can manually supply their user credentials to the interface, or the interface can be adapted to receive the user credentials from the shared device cards through the portable user devices.

The processor is adapted to use the entity-specific authentication configuration settings to supply, through the computerized network, the user credentials to the entity-specific authentication servers specified in the entity-specific authentication configuration settings, using the communication device. The communication device is adapted to receive approval for access to the multi-function device from the entity-specific authentication servers.

Different shared device cards can have different entity-specific authentication configuration settings, each of which corresponds to only one entity-specific authentication server, which limits each of the shared device cards to use with a single authentication server. The different entity-specific authentication configuration settings can contain different authentication requirements. Further, each of the shared device cards is adapted to maintain only one of the user credentials that is different from other user credentials maintained by other shared device cards, and each of the shared device cards is adapted to maintain only one of the entity-specific authentication configuration settings. Thus, each of the shared device cards is entity-specific to a single entity, and each of the shared device cards is user-specific to a single user associated with the corresponding portable user device on which the shared device card is maintained.

These and other features are described in, or are apparent from, the following detailed description.

BRIEF DESCRIPTION OF THE DRAWINGS

Various exemplary systems and methods are described in detail below, with reference to the attached drawings, in which.

DETAILED DESCRIPTION

As mentioned above, one issue that must be addressed in shared office spaces is how to have individual login method information and credentials easily accessible to pass the information to the shared device. In order to address such issues, systems and methods herein provide a touchless solution to process the login method and credential information so the device knows how to authenticate a user in an uncomplicated manner. Office products are typically connected to computer networks and can access a network "off box" (meaning outside the shared document processing device) service that contains information about login methods.

Typically, the login method for each different employer/company will be unique. Each individual shared document processing device could be manually configured by a system administrator using each company's different login protocols. A digital wallet is an application concept that allows users to transfer information to another device and this concept is traditionally used for making electronic transactions of currency. The embodiments described below include a shared device card with a unique identifier in such digital wallets. The unique identifier maps to a user's specific information relating to their companies detailed configurations.

With systems and methods herein, when the user walks up to a shared document processing device that has not been previously configured for them or their employer, they can open their digital wallet on their mobile device and select the shared device card that has their unique login information and login protocol for accessing the shared document processing device. The user can then tap their mobile device to the office product and the configuration and authentication information is passed to the shared document processing device via, for example, near field communication (NFC) technology. The device then uses the user's login information and login protocol to query the off box service and temporarily configure the device.

With this, embodiments herein provide a quick, uncomplicated, touchless way for an employee to use any office product with Internet access that is connected to the off box server to login to their account and access the value added services that their employer has purchased. Examples of where this capability is useful include not only coworking spaces, but also public locations such as airports and other transportation hubs, and also office services businesses such as on demand print shops. Another feature is the increase in security parameters that come from utilizing a user's mobile device multi-factor and biometric authentication features.

Figure 1:
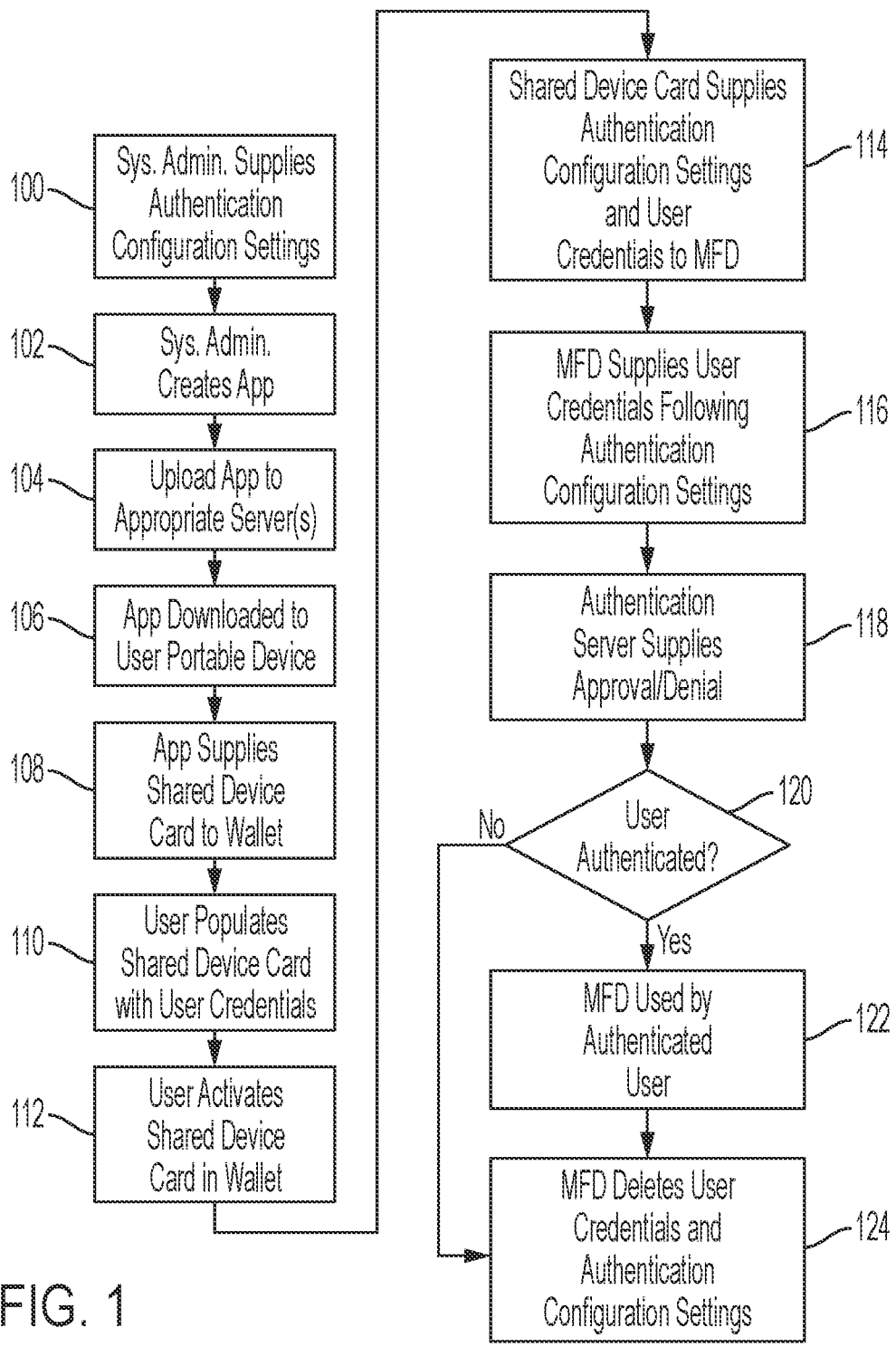
FIG. 1 is a flow diagram of various methods herein.

FIG. 1 is flowchart illustrating exemplary methods herein. In item 100, with these methods a system administrator supplies authentication configuration settings in processing that creates downloadable apps. The authentication configurations settings specify the information that is needed for an authentication server to authenticate a user and can include, for example, username, user identifier, password, access codes, access shared device card data, biometric data, etc. Different system administrators for different entities can specify different information that is needed for user authentication, making each app entity specific. The different entities can be, for example, corporations, organizations, groups, individuals, etc., and the methods herein allow each different app configured by each different entity's system administrator to incorporate authentication features differently depending upon the different preferences each entity will have.

In item 102, any additional information needed to complete the app is configured by the system administrator(s) to finalized and create the app that is maintained on servers from which it can be downloaded. Such additional information can include but is not limited to the app identifier, the uniform resource locator (URL) or other network address of the server, any server credentials or other data needed to connect with the server, specifics of shared device cards that the app can supply, specifics of the app's interactions with digital wallets, user rights or restrictions on using features of document processing devices, etc.

In item 104, the app is placed on any appropriate server(s) that will allow the app to be downloadable. This could be a single server or multiple servers and could be for example, the authentication server or another server or servers. As shown in item 106, methods herein supply the app to portable user devices through a computerized network by allowing the portable user device to download the app from the appropriate server.

The initiation of the download in item 106 can be performed automatically or at user instruction. For example, shared office equipment or shared document processing equipment that can print, scan, fax, and/or email, etc., within co-working environments could include printed instructions (signs) on the exterior of the shared device or adjacent the shared device (e.g., signs with text listing app's URL, quick reference (QR) codes, bar codes, etc.) guiding users through processes of downloading such apps and potentially using such apps to add a shared device card to the digital wallets maintained by user portable devices. In other alternatives in item 106, wireless communication methods (e.g., WiFi, near field communications (NFC), etc.) can send instructions to the portable user device and cause the app to be automatically downloaded to the portable user device (possible after asking user permission).

As shown in item 108, with these methods, the app provides shared device cards to digital wallets of the portable user devices. The app is adapted to work with many different types of digital wallets that may be maintained by a diverse set of user portable devices so as to create/supply a shared device card (or other similar wallet element) that can be maintained and accessed by such known digital wallets. Specifically in item 108, the app can be preloaded to work with specific digital wallets or the app (once installed on a user portable device) can be adapted to interrogate an unknown digital wallet to determine the digital wallet's requirements, etc., for adding new shared device cards/wallet elements.

With such methods, different shared device cards stored on different user portable devices in item 108 will generally have different entity-specific authentication configuration settings and each of the different entity-specific authentication configuration settings corresponds to only one of the entity-specific authentication servers, thereby limiting each of the shared device cards in item 108 to use with a single entity's authentication server(s).

As noted above, different system administrators for different entities can specify different information that is needed for user authentication, making each app entity specific and correspondingly the different entity-specific authentication configuration settings in the shared device cards generated in item 108 can contain different authentication requirements based on the entity that corresponds to the user and their portable device on which the shared device cards are stored.

Once the shared device card is established within the digital wallet, as shown in item 108, the user populates the shared device card with user credentials, or any additional information needed for the user to be authenticated, as shown in item 110. In other options, the user can be required to supply some or all of their user credentials to the app when the app is creating the shared device card in item 108.

For example, in item 110 (or potentially item 108), the app or the shared device card may require the user to supply their username, password, access code, biometrics, etc., and these user credentials are added to the shared device card. Some, or all, of the required user credentials can be supplied in item 110 or additional user credentials can be supplied later in the processing (e.g., see item 114, discussed below).

The processing in item 110 can be done directly through user interaction with the digital wallet or user interaction with the app which supplements the shared device card with such user credentials. Therefore, in item 110 (or potentially later in the processing) a user's name, password, biometric scans, etc., may all be stored within the shared device card in the user's digital wallet to save time in the future when the user actually interacts with and operates the shared processing device. Further, in item 110 such data within the shared device card can be required to be updated by the user periodically (e.g., upon the expiration of timers, etc.) where, in such situations, the user may be required to re-supply (or change) their password, biometric scan, etc. periodically (e.g., monthly).

Additionally, in item 110, once details of the user's identification are populated, the app (operating on the user portable device) may contact the entity's authentication server to automatically populate the shared device card with any other user-specific information of interest, such as user rights or restrictions on different features of the document processing device. Therefore, in item 110 these methods can also potentially populate each card with user rights and restrictions.

Thus, with the processing in item 110, each shared device card maintains only one user's credentials and those credentials are different from all other user's credentials maintained by other shared device cards held by other users. Further, each of the shared device cards maintains only one entity-specific authentication configuration settings. Thus, each of the shared device cards is entity-specific to a single entity, and each of the shared device cards is also user-specific to a single user who is associated with the corresponding portable user device on which the shared device card and corresponding digital wallet are maintained.

As shown in item 112 in FIG. 1, when the user desires to operate the shared document processing device the user opens their digital wallet on their user portable device and, once in the wallet, activates or selects the shared device card in the digital wallet. In response to being activated in item 112, the shared device card automatically supplies entity-specific authentication configuration settings to the document processing device using wireless receivers and transmitters (e.g., WiFi, NFC, etc.) of the user portable device and the document processing device in item 114.

In item 114, the document processing device may optionally also receive any required user credentials that were not populated to the card in item 110, discussed above. For example, in item 114 users can manually supply any missing user credentials to an interface of the document processing device or portable user device. Thus, the shared device card may maintain the user's name, etc., but not maintain biometric or password data and, in such a situation, the user would only be requested to supply the missing password, biometric scan, etc., and such can be supplied through the user portable device or shared document processing device, depending upon the equipment each device maintains.

If all user credentials are stored previously in the shared device card (e.g., item 110) the document processing device can receive all needed user credentials just from the shared device card. Also, any other relevant information, such as user rights or restrictions to document processing device features can be automatically transferred from the shared device card to the document processing device if such data is maintained on the shared device card.

In item 116, the document processing device uses the entity-specific authentication configuration settings to supply, through the computerized network, the user credentials to entity-specific authentication servers that are specified in the entity-specific authentication configuration settings. Again, the app loads the shared device card with the uniform resource locator (URL) or other network address of at least one entity-specific authentication server, any server credentials or other data needed to connect with the server, etc., and the same information is transferred from the shared device card to the document processing device in item 116. This provides the document processing device all information needed to supply a properly formatted and documented entity-specific authentication request to the appropriate server through the computerized network in item 116.

In some alternatives herein, two-factor authentication processing in item 116 may require a user to utilize a one-time use code. In one example, a one-time use code can be sent during the authentication process in item 116 from the authentication server to the user portable device. The user can manually supply the one-time use code to the document processing device; or wireless communications or screen shot scans can be used to supply the one-time use code directly from the user portable device to the document processing device. The document processing device can send such one-time use codes to the authentication server as an additional item needed for user authentication.

In response, as shown in item 118, the document processing device receives (from the entity-specific authentication servers) approval for the user to use the document processing device or disapproval. If user rights to certain features of the document processing device are limited, such user rights limitations can be supplied by the authentication server along with the approval for user access in item 118. Alternatively, as noted above, in item 114 the user rights/restrictions can be supplied from the shared device card to the document processing device (if such rights are maintained in the shared device card, as discussed above).

Once authenticated (item 120), the user is allowed full or limited access rights to the document processing device in item 122. Thus, once a user is granted access, such document processing devices are used for copying documents, printing documents, scanning documents, sending and receiving facsimiles, sending and receiving emails, and/or editing documents, etc.

After the user operates the shared processing device in item 122 or if the user is denied access in item 120, any data transferred from the shared device card to the document processing device can optionally be deleted from the document processing device for heightened security or to prevent overburden of document processing device resources as shown in item 124. In some examples, to reduce the number of times a user must be authenticated, to reduce network traffic, and/or reduce authentication server utilization, the deletion of shared device card data from the document processing device in item 124 can be delayed using a timer that can keep a user authenticated for minutes, hours, days, weeks, etc., after authentication or completion of device usage.

Some different examples of different card deletion timers include a coworking space user who typically spends an entire day in the coworking space and can have a card deletion timer set so that the user authentication expires at the end of the day (e.g., deletion of all user credentials and authentication settings from the shared processing device occurs only once daily), requiring such a coworking space user to only be authenticated once daily. In contrast, a shared device at an airport may have an immediate or very short card deletion timer for all users so that deletion of all user credentials and authentication settings from the shared processing device occurs after each use is completed in item 122.

Thus FIG. 1 shows that the methods herein provide a quick, uncomplicated, touchless way for individuals in coworking spaces to gain access to features of shared processing devices. These capabilities are useful include not only in coworking spaces, but also in public locations such as airports and other transportation hubs, and office services businesses such as on demand print shops.

Figure 2:
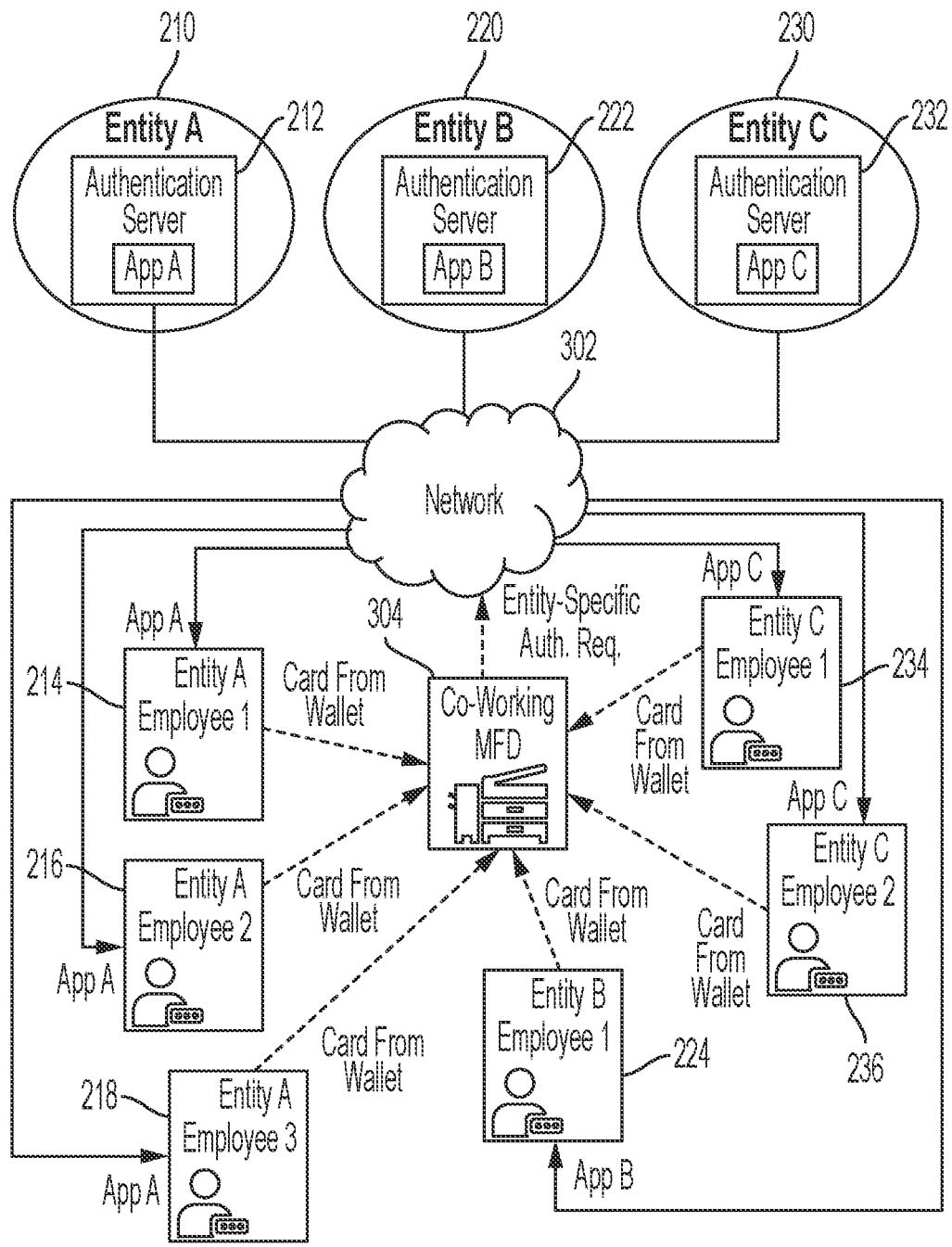
FIGS. 2-4 are schematic diagram illustrating systems herein.
Figure 3:
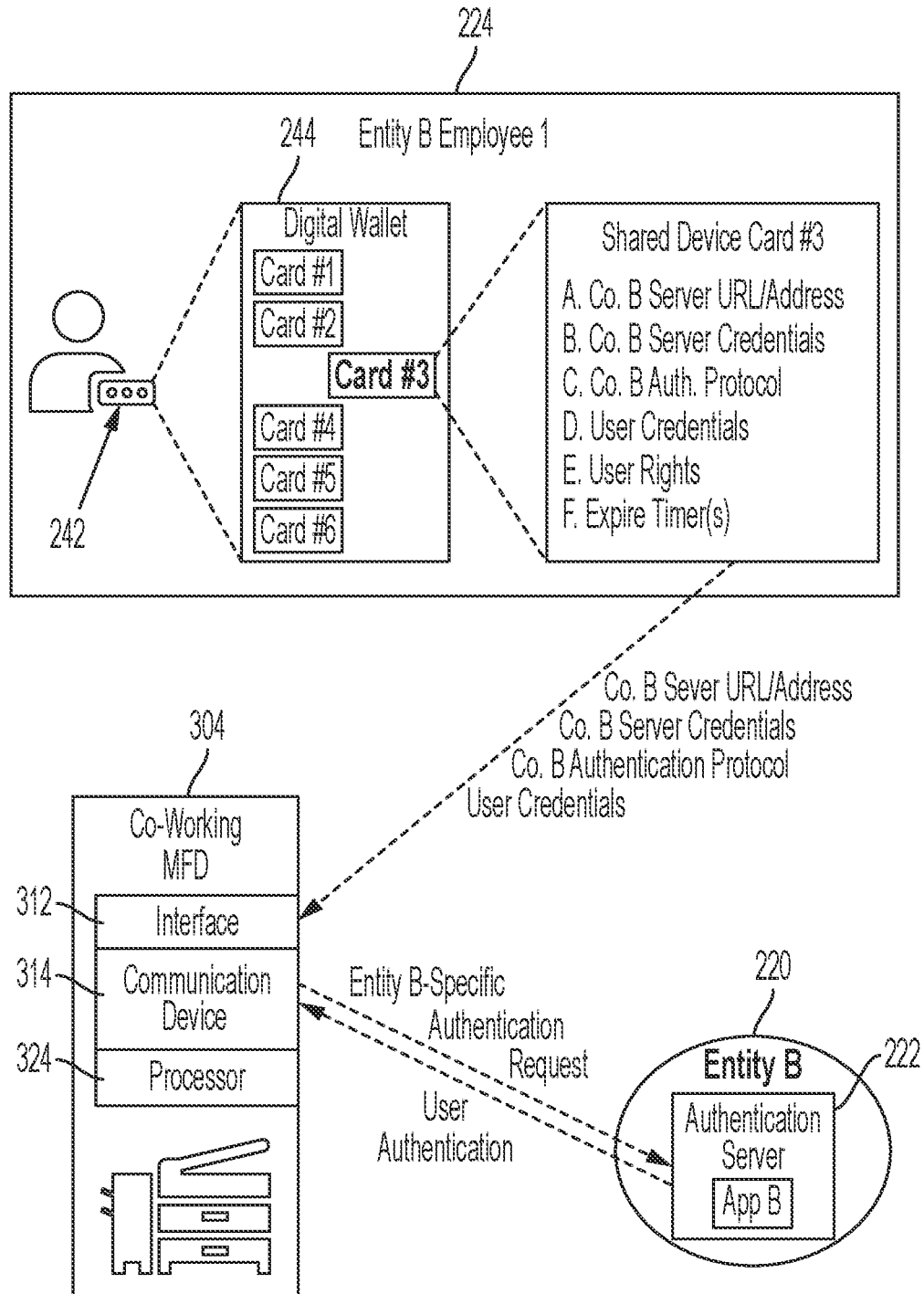

FIGS. 2-3 illustrate systems herein. As shown in FIG. 2, various entities 210, 220, 230 are connected to (and communicate through) a computerized network 302, which can be a wide area network (WAN, such a public network such as the Internet) or a local, private network, etc. The entities 210, 220, and 230 each independently maintain at least one server 212, 222, 232, such as authentication servers. As also shown in FIG. 2, the servers 212, 222, 232 store differently configured apps (App A, App B, App C) which are available for download through the network 302.

Additionally, FIG. 2 conceptually shows a co-working arrangement where employees of the entities 210, 222, 230 share a co-working document processing device (note the multi-function device (MFD) 304 shown in FIGS. 2-3 is intended to represent all forms of individual and multi-component document processing devices). Specifically, as shown by solid-line arrows from the network 302 in FIG. 2, Employee 1 of Entity A (214), Employee 2 of Entity A (216), and Employee 3 of Entity A (218) each download the same App A to their corresponding user portable devices (242, FIG. 3) from server 212 of Entity A 210; Employee 1 of Entity B (224) downloads App B to their corresponding user portable devices (242, FIG. 3) from server 222 of Entity B 220; and Employee 1 of Entity C (234) and Employee 2 of Entity C (236) both download the same App C to their corresponding user portable devices (242, FIG. 3) from server 232 of Entity C 230. Note that App A, App B, and App C all have different authentication criteria/protocols.

As discussed above in FIG. 1, the shared device cards are supplied with user credentials and entity-specific authentication configuration settings. As shown in FIG. 2, each of these employees supplies their individual shared device card from their digital wallet maintained within their corresponding user portable device 242 as shown by the broken-line arrows in FIG. 2. With the entity-specific authentication configuration settings and the user credentials from the shared device cards, the co-working document processing device 304 supplies the entity-specific authentication request to the servers 212, 222, 232, of the various entities (Entity A, Entity B, Entity C). In response, authentication is granted or denied for an employee to use the co-working document processing device 304.

In greater detail, as shown in both FIGS. 2-3 exemplary systems herein can include (among other components) a document processing device 304 that is adapted to process documents. The document processing device 304 includes (among other components) an interface 312 and a communication device 314, both operatively connected to a processor 324.

The following example uses App B that creates and stores shared device card #3 in the digital wallet 244 of Employee 1 of Entity B 224 that is shown in FIG. 3, but reference is also made to some components shown in FIG. 2 in the following discussion. As can be seen in FIG. 3, the digital wallet 244 of Employee 1 of Entity B 224 contains other cards (card #1, #2, and #4-#6) that are unrelated to and not useful with the document processing device 304, and such other cards are instead used for other functions, such as financial transactions, event/transportation tickets, keyless entry systems, etc.

App B is adapted to operate with digital wallets of portable user devices 242, such as digital wallet 244 by, for example, supplying shared device card #3 to digital wallet 244. As shown in FIG. 3, App B creates shared device card #3 to include the A) server 222 URL (or other network address); B) credentials to access server 222; C) the various authentication protocols used by Entity B 220; D) the user credentials supplied by App B or the employee 224; E) user rights/restrictions; F) any timers that may be used to remove shared device card B's data from the document processing device 304 or require resubmission of passwords, biometric scans; etc. Note that the above is non-exhaustive list and only provides one limited example of what shared device card #3 could include and shared device card #3 could include other data, more data, or less data, etc.

Thus, as shown by a broken-line arrow from shared device card #3 to the interface 312, shared device card #3 is adapted to supply entity-specific authentication configuration settings and user-specific user credentials to the document processing device 304 through the interface 312. As explained above in the discussion of FIG. 1, the document processing device 304 is adapted to receive user credentials from the employee 224 and/or shared device card #3. As noted above, with these systems, users can manually supply their user credentials to the interface 312, or the document processing device 304 can be adapted to receive the user credentials exclusively from shared device card #3 through the portable user device 242.

As shown in FIGS. 2 and 3, the processor 324 is adapted to use the entity-specific authentication configuration settings to supply (through the computerized network 304) the user credentials to the entity-specific authentication server 222 specified in the entity-specific authentication configuration settings, using the communication device 314. In response, the communication device 314 is adapted to receive (from the entity-specific authentication servers) approval/denial for the user to access the document processing device 304.

Thus, shared device card #3 is adapted to maintain only the user credentials of employee 224 that is different from other user credentials maintained by other shared device cards in other digital wallets, because each of the shared device cards is adapted to maintain only one user-specific user credentials and only one entity-specific authentication configuration settings. Thus, as with all other shared device cards, shared device card #3 is entity-specific to Entity B 220, and shared device card #3 is user-specific to a single user (employee 224) associated with the corresponding portable user device on which shared device card #3 is maintained.

Figure 4:
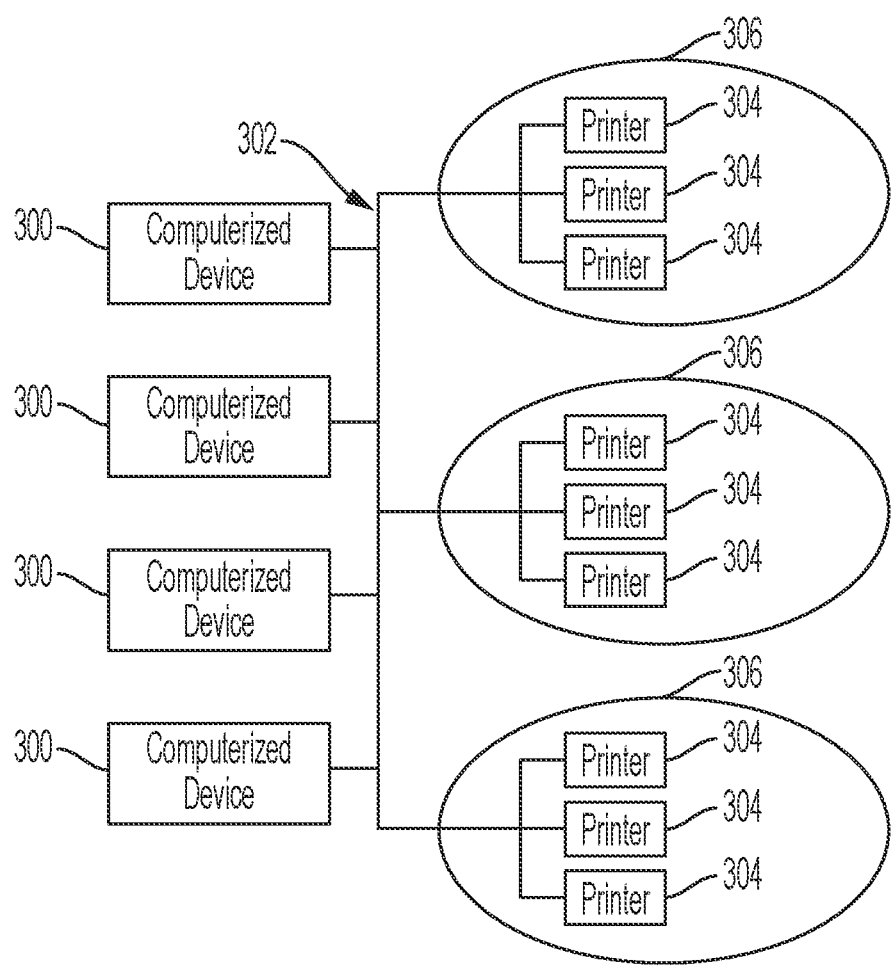

As shown in FIG. 4, exemplary systems and methods herein include various computerized devices 300, 304 located at various different physical locations 306. The computerized devices 300, 304 can include print servers, printing devices, personal computers, etc., and are in communication (operatively connected to one another) by way of a local or wide area (wired or wireless) network 302.

Figure 5:
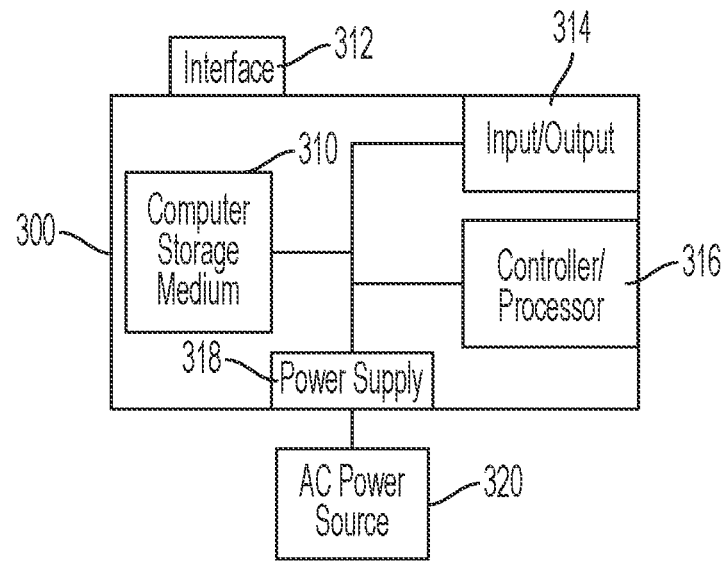
FIG. 5 is a schematic diagram illustrating computing devices herein.

FIG. 5 illustrates a computerized device 300, which can be used with systems and methods herein and can comprise, for example, a print server, a personal computer, a portable computing device, etc. The computerized device 300 includes a controller/tangible processor 316 and a communications port (input/output) 314 operatively connected to the tangible processor 316 and to the computerized network 302 external to the computerized device 300. Also, the computerized device 300 can include at least one accessory functional component, such as a user interface (UI) assembly 312. The user may receive messages, instructions, and menu options from, and enter instructions through, the user interface or control panel 312.

The input/output device 314 is used for communications to and from the computerized device 300 and comprises a wired device or wireless device (of any form, whether currently known or developed in the future). The tangible processor 316 controls the various actions of the computerized device. A non-transitory, tangible, computer storage medium device 310 (which can be optical, magnetic, capacitor based, etc., and is different from a transitory signal) is readable by the tangible processor 316 and stores instructions that the tangible processor 316 executes to allow the computerized device to perform its various functions, such as those described herein. Thus, as shown in FIG. 5, a body housing has one or more functional components that operate on power supplied from an alternating current (AC) source 320 by the power supply 318. The power supply 318 can comprise a common power conversion unit, power storage element (e.g., a battery, etc.), etc.

Figure 6:
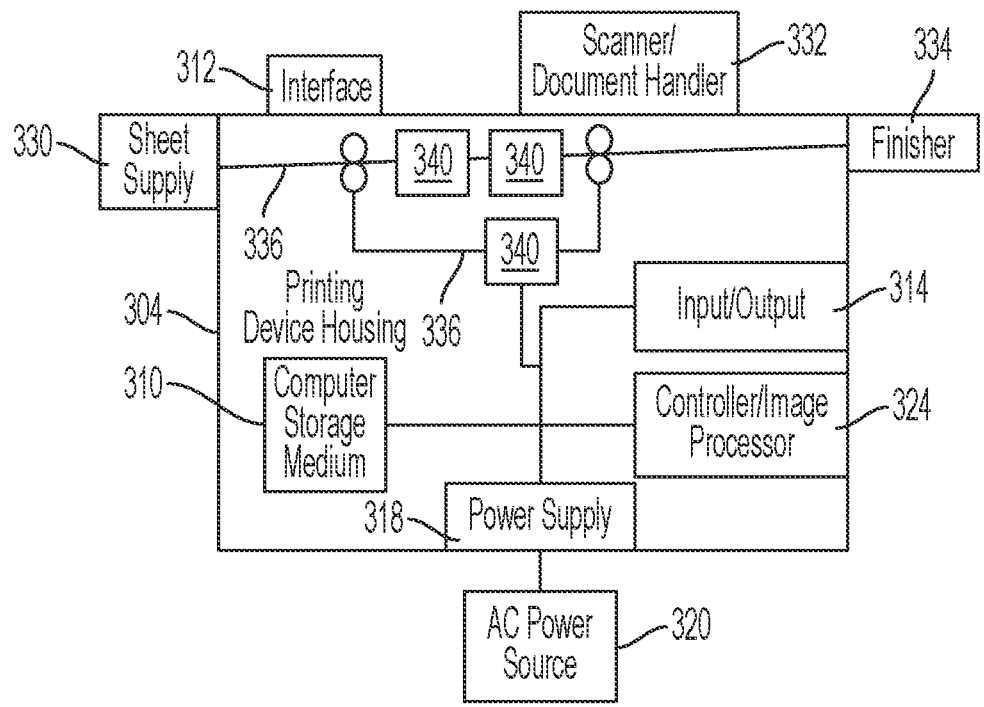
FIG. 6 is a schematic diagram illustrating multi-function devices herein.

FIG. 6 illustrates a computerized device that is a printing device 304, which can be used with systems and methods herein and can comprise, for example, a printer, copier, multi-function machine, multi-function device (MFD), etc. The printing device 304 includes many of the components mentioned above and at least one marking device (printing engine(s)) 340 operatively connected to a specialized image processor 324 (that is different from a general purpose computer because it is specialized for processing image data), a media path 336 positioned to supply continuous media or sheets of media from a sheet supply 330 to the marking device(s) 340, etc. After receiving various markings from the printing engine(s) 340, the sheets of media can optionally pass to a finisher 334 which can fold, staple, sort, etc., the various printed sheets. Also, the printing device 304 can include at least one accessory functional component (such as a scanner/document handler 332 (automatic document feeder (ADF)), etc.) that also operate on the power supplied from the external power source 320 (through the power supply 318).

The one or more printing engines 340 are intended to illustrate any marking device that applies a marking material (toner, inks, etc.) to continuous media or sheets of media, whether currently known or developed in the future and can include, for example, devices that use an ink jet imaging system, or a high-speed aqueous imaging system.

Multi-function devices herein include (among other components) an interface 312 and a communication device 314 both operatively connected to a processor 324. Such multi-function devices are adapted to, for example, copy documents, print documents, scan documents, send and receive facsimiles, send and receive emails, and/or edit documents, etc.

As described above, the interface 312 is adapted to communicate with shared device cards supplied to portable user devices by an app. The app is adapted to operate with digital wallets of the portable user devices by supplying the shared device cards to the digital wallets. The app is adapted to be supplied from entity-specific authentication servers to the portable user devices through a computerized network.

The shared device cards are adapted to supply entity-specific authentication configuration settings to the multi-function device through the interface 312. The interface 312 is also adapted to receive user credentials. For example, users can manually supply their user credentials to the interface 312, or the interface 312 can be adapted to receive the user credentials from the shared device cards through the portable user devices.

The processor 324 is adapted to use the entity-specific authentication configuration settings to supply, through the computerized network, the user credentials to the entity-specific authentication servers specified in the entity-specific authentication configuration settings, using the communication device 314. The communication device 314 is adapted to receive approval for access to the multi-function device from the entity-specific authentication servers.

Different shared device cards can have different entity-specific authentication configuration settings, each of which corresponds to only one entity-specific authentication server, which limits each of the shared device cards to use with a single authentication server. The different entity-specific authentication configuration settings can contain different authentication requirements. Further, each of the shared device cards is adapted to maintain only one of the user credentials that is different from other user credentials maintained by other shared device cards, and each of the shared device cards is adapted to maintain only one of the entity-specific authentication configuration settings. Thus, each of the shared device cards is entity-specific to a single entity, and each of the shared device cards is user-specific to a single user associated with the corresponding portable user device on which the shared device card is maintained.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock TX, USA and Apple Computer Co., Cupertino CA, USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, CT, USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

Further, the term "app" (or "application") describes one or more methodologies or processes performed using computerized devices and such apps can be embodied in software, firmware, hardware, etc. Therefore, apps herein are one or more sets of instructions embodied in languages machines can understand that direct a computerized device to perform or stop some action. The apps herein can, for example: direct computerized devices to display items on user interfaces that users can interact with; direct computerized devices to communicate with and transfer data between other devices over computerized networks; direct processes to automatically begin or end and direct the computerized devices to perform each of the individual steps of such processes automatically; direct computerized devices to store data, delete data, perform computations using data, etc.; and/or direct computerized devices to set and monitor timers; etc.

In addition, terms such as automated or automatically mean that once a process is started (by a machine or a user), one or more machines perform the process without further input from any user. Additionally, terms such as "adapted to" mean that a device is specifically designed to have specialized internal or external components that automatically perform a specific operation or function at a specific point in the processing described herein, where such specialized components are physically shaped and positioned to perform the specified operation/function at the processing point indicated herein (potentially without any operator input or action). In the drawings herein, the same identification numeral identifies the same or similar item.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
   by a server, supplying an app to user devices, wherein:
      the app is configured to supply, to a digital wallet of each of the user devices, a unique shared device card, and
      each of the shared device cards includes user-specific user credentials for only one user and entity-specific configuration settings for a shared document processing device; and
   by the shared document processing device:
      receiving, from a first shared device card via wireless transmission with one of the user devices that is associated with a first user, user credentials for the first user,
      using the received user credentials to select an entity-specific authentication server that corresponds to the entity-specific configuration settings,
      sending the user credentials received from the first shared device card to the selected entity-specific authentication server,
      in response to receiving approval from the selected entity-specific authentication server, granting the first user access to operate the shared document processing device, and
      after the first user operates the shared document processing device, deleting any data that shared document processing device the received from the first shared device card.

2. The method of claim 1, further comprising:
   before deleting the data, using a timer to delay the deleting until a particular period of time after the first user was granted access or completed operation of the shared document processing device; and
   performing the deleting after the particular period of time expires.

3. The method of claim 1 wherein, for each of the shared device cards:
   the app receives the entity-specific configuration settings for only one entity from an authentication server of that entity; and
   the app receives the user credentials from the first user via interaction of the user with the digital wallet or the app via a user interface.

4. The method of claim 3, wherein:
the entity-specific configuration settings comprise user rights or restrictions on one or more features of the shared document processing device; and
granting the first user access to operate the shared document processing device comprising granting the first user access to only those features of the shared document processing device for which the entity-specific configuration settings include user rights.

5. The method of claim 1, further comprising:
after granting the first user access, using the shared document processing device for one or more of the following operations: copying a document; printing a document; scanning a document; sending or receiving a facsimile; sending or receiving an email; or editing a document.

6. The method of claim 1, wherein receiving the user credentials for the first user occurs in response to the first user activating or selecting the first shared device card in the digital wallet of the user device that is associated with the first user.

7. The method of claim 1, wherein receiving wireless transmission comprises near field communication (NFC) technology.

8. The method of claim 1 further comprising:
sending a one-time code to the user device that is associated with the first user;
by the document processing device prior to sending the user credentials to the selected entity-specific authentication server, receiving the one-time code from the first user; and
when sending the user credentials to the selected entity-specific authentication server, also sending the one-time code to the selected entity-specific authentication server.

9. A system comprising:
a server configured to supply an app to user devices, wherein:
the app is configured to supply, to a digital wallet of each of the user devices, a unique shared device card, and
each of the shared device cards includes user-specific user credentials for only one user and entity-specific configuration settings for a shared document processing device; and
a document processing device comprising a processor and a computer storage medium containing programming instructions that are configured to cause the processor to:
in response to receiving, from a first shared device card via wireless transmission with one of the user devices that is associated with a first user, user credentials for the first user, use the received user credentials to select an entity-specific authentication server that corresponds to the entity-specific configuration settings,
send the user credentials received from the first shared device card to the selected entity-specific authentication server,
in response to receiving approval from the selected entity-specific authentication server, grant the first user access to operate the document processing device, and
after the first user operates the document processing device, delete any data that shared document processing device the received from the first shared device card.

10. The system of claim 9, further comprising additional programming instructions that are configured to cause the processor to:
before deleting the data, use a timer to delay the deleting until a particular period of time after the first user was granted access or completed operation of the document processing device; and
perform the deleting after the particular period of time expires.

11. The system of claim 9, wherein the app is further configured to, for each of the shared device cards:
receive the entity-specific configuration settings for only one entity from an authentication server of that entity; and
receive the user credentials from the first user via interaction of the first user with the digital wallet or the app via a user interface.

12. The system of claim 11, wherein:
the entity-specific configuration settings comprise user rights or restrictions on one or more features of the document processing device; and
the instructions to grant the first user access to operate the shared document processing device comprise instructions to grant the first user access to only those features of the document processing device for which the entity-specific configuration settings include user rights.

13. The system of claim 9, further comprising additional programming instructions that are configured to cause the processor to:
after granting the first user access, cause the document processing device to perform one or more of the following operations: copy a document; print a document; scan a document; send or receive a facsimile; send or receive an email; or edit a document.

14. The system of claim 9, wherein the document processing device is configured to receive the user credentials for the first user occurs in response to the first user activating or selecting the shared device card in the digital wallet of the user device that is associated with the first user.

15. A system comprising:
a first non-transitory computer storage medium storing programming instructions that are configured to cause a server to supply an app to user devices, wherein:
the app is configured to supply, to a digital wallet of each of the user devices, a unique shared device card, and
each of the shared device cards includes user-specific user credentials for only one user and entity-specific configuration settings for a shared document processing device; and
a second non-transitory computer storage medium storing programming instructions that are configured to cause a processor of a document processing device to:
in response to receiving, from a first shared device card via wireless transmission with one of the user devices that is associated with a first user, user credentials for the first user, use the received user credentials to select an entity-specific authentication server that corresponds to the entity-specific configuration settings,
send the user credentials received from the first shared device card to the selected entity-specific authentication server,
in response to receiving approval from the selected entity-specific authentication server, grant the first user access to operate the document processing device, and after the first user operates the document processing device, delete any data that shared document processing device the received from the first shared device card.

16. The system of claim 15, further comprising additional programming instructions that are configured to cause the processor to:
   before deleting the data, use a timer to delay the deleting until a particular period of time after the first user was granted access or completed operation of the document processing device; and
   perform the deleting after the particular period of time expires.

17. The system of claim 15, wherein the app is further configured to, for each of the shared device cards:
   receive the entity-specific configuration settings for only one entity from an authentication server of that entity; and
   receive the user credentials from the first user via interaction of the first user with the digital wallet or the app via a user interface.

18. The system of claim 17, wherein:
   the entity-specific configuration settings comprise user rights or restrictions on one or more features of the document processing device; and
   the instructions to grant the first user access to operate the shared document processing device comprise instructions to grant the first user access to only those features of the document processing device for which the entity-specific configuration settings include user rights.

19. The system of claim 15, further comprising additional programming instructions that are configured to cause the document processing device to:
   after granting the first user access, perform one or more of the following operations: copy a document; print a document; scan a document; send or receive a facsimile; send or receive an email; or edit a document.

20. The system of claim 15, wherein the instructions are also configured to receive the user credentials for the first user in response to the first user activating or selecting the shared device card in the digital wallet of the user device that is associated with the first user.

* * * * *